(12) United States Patent
Kobayashi

(10) Patent No.: US 6,389,893 B1
(45) Date of Patent: May 21, 2002

(54) FUEL AMOUNT DETECTOR

(75) Inventor: Masahide Kobayashi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/359,936

(22) Filed: Jul. 22, 1999

(30) Foreign Application Priority Data

Aug. 19, 1998 (JP) ............................................ 10-233139

(51) Int. Cl.$^7$ .......................... G01F 23/00; G01F 23/14; G01F 23/30; G01F 23/64
(52) U.S. Cl. ........................................ 73/305; 73/290 B
(58) Field of Search .................... 73/290 B, 290 R, 73/299, 301, 305, 313, 326

(56) References Cited

U.S. PATENT DOCUMENTS

| | | | |
|---|---|---|---|
| 3,241,368 A | * 3/1966 | Newitt ...................... 73/290 B |
| 4,194,396 A | 3/1980 | Ohsawa et al. ............... 73/311 |
| 4,571,987 A | * 2/1986 | Horner ...................... 73/292 X |
| 4,646,560 A | * 3/1987 | Maresca, Jr. et al. ..... 73/299 X |
| 4,724,705 A | * 2/1988 | Harris ........................... 73/313 |
| 4,840,064 A | * 6/1989 | Fudim ....................... 73/290 B |
| 4,964,296 A | * 10/1990 | Jensen ...................... 73/299 X |
| 5,687,607 A | * 11/1997 | Brande et al. ............ 73/290 R |
| 5,887,616 A | 3/1999 | Ikeda et al. ................. 137/558 |
| 6,038,919 A | * 3/2000 | Schmitt et al. ....... 73/290 B X |

FOREIGN PATENT DOCUMENTS

| | | | |
|---|---|---|---|
| DE | 28 30 054 | 1/1979 | ........... B65D/90/48 |
| DE | 196 24 911 | 1/1997 | ........... G01F/23/00 |
| JP | 4-301723 | * 10/1992 | ........... G01F/23/00 |
| JP | HEI9-5140 | 1/1997 | ........... G01F/23/00 |
| JP | 2000-35356 | * 2/2000 | ........... G01F/23/00 |

* cited by examiner

*Primary Examiner*—Thomas P. Noland
(74) *Attorney, Agent, or Firm*—Kenyon & Kenyon

(57) ABSTRACT

A fuel storage device includes a fuel chamber storing fuel therein, a volume of the fuel chamber changing in accordance with a change in an amount of fuel in the fuel chamber. The amount of fuel in the fuel chamber is detected based on the displacement of at least two portions of a member constituting the fuel chamber that are displaceable in accordance with the amount of fuel in the fuel chamber.

6 Claims, 15 Drawing Sheets

FUEL AMOUNT DETECTOR

INCORPORATION BY REFERENCE

The disclosure of Japanese Patent Application No. HEI 10-233139 filed on Aug. 19, 1998 including the specification, drawings and abstract is incorporated herein by reference in its entirety.

BACKGROUND OF THE INVENTION

1. Field of the Invention

The present invention relates to a fuel amount detector.

2. Description of the Related Art

According to Japanese Patent Application No. HEI 9-5140, a fuel chamber is formed by a film in close contact with the surface of liquid fuel in a fuel tank and displaceable therewith, so as to reduce an amount of fuel vapor generated in the fuel tank. In this fuel tank, the amount of fuel in the fuel chamber is detected based on displacement of a portion of the film.

The aforementioned film has portions that are displaced differently depending on displacement of the surface of liquid fuel in the fuel tank. Thus, the portion of the aforementioned film for detecting an amount of fuel in the fuel chamber may not be displaced while another portion of the film may be deformed. In this case, it is impossible to precisely detect an amount of fuel in the fuel chamber. Especially in the case where the aforementioned fuel tank is installed in a moving body such as a vehicle, the film may be deformed in an unusual manner due to inclination, acceleration or deceleration of the vehicle. In this case, it is also impossible to precisely detect an amount of fuel in the fuel chamber.

SUMMARY OF THE INVENTION

It is an object of the present invention to precisely detect an amount of fuel in a fuel chamber of a fuel storage device having a plurality of portions that are displaceable differently according to an amount of fuel in the fuel chamber.

A fuel amount detector according to a first aspect of the present invention comprises a fuel storage device provided with a fuel chamber for storing fuel wherein the fuel chamber changes its volume in accordance with a change in an amount of fuel in the fuel chamber. In this fuel amount detector, at least two portions of a member forming the fuel chamber are displaceable in accordance with an amount of fuel in the fuel chamber, and the amount of fuel in the fuel chamber is detected based on displacement of the at least two portions. That is, the amount of fuel in the fuel chamber is detected based on displacement of the at least two portions, which are displaced in accordance with the amount of fuel in the fuel chamber.

In the aforementioned first aspect, the aforementioned two portions may be portions of a wall of the fuel chamber whose displacement directions and displacement amounts are different from each other.

Furthermore, in the first aspect, the fuel amount detector may include a position sensor for detecting relative displacement of the two portions. In this case, the fuel amount detector detects an amount of fuel in the fuel chamber based on the relative displacement of the two portions detected by the position sensor. In addition, the position sensor may be provided with a reference contact point abutting on one of the two portions and a detection contact point abutting on the other of the two portions. In this case, relative displacement of the two portions is detected based on a position of the detection contact point with respect to the reference contact point.

In the aforementioned first aspect, the fuel chamber may be provided with upper and lower walls that are displaced independent of each other in accordance with a change in an amount of fuel in the fuel chamber. In this case, the two portions constitute parts of the upper and lower walls.

In a second aspect of the present invention, the following features are added to the first aspect of the present invention. That is, the fuel chamber is formed of polygonal walls opposed to each other and side walls connecting end portions of the polygonal walls to each other. The polygonal walls and the side walls are deformable in accordance with a change in amount of fuel in the fuel chamber. The amount of fuel in the fuel chamber is detected based on displacement of the polygonal walls or the side walls in the fuel storage device resulting from deformation of the polygonal walls or the side walls. Namely, the amount of fuel is detected based on displacement of the two portions of the polygonal walls or the side walls that are displaced in accordance with the amount of fuel in the fuel chamber. Thus, the polygonal walls and the side walls constituting the fuel chamber are displaced substantially in a constant direction in accordance with an amount of fuel in the fuel chamber. Hence, displacement of the polygonal walls and the side walls can be detected precisely, so that the amount of fuel in the fuel chamber can be detected precisely.

In the aforementioned second aspect, the fuel chamber may have a generally rectangular parallelepiped shape. In this case, the polygonal walls opposed to each other constitute the upper and lower walls of the fuel chamber, and the fuel amount detector detects an amount of fuel in the fuel chamber based on displacement of the upper and lower walls of the fuel chamber.

In a third aspect of the present invention, the following features are added to the first aspect of the present invention. That is, an extendable member is disposed in the fuel chamber. A section of the extendable member is attached to one of the at least two portions and another section of the extendable member is attached to the other of the at least two portions, and an amount of fuel in the fuel chamber is detected based on relative displacement between the sections of the extendable member that are attached to the two portions respectively. Namely, the amount of fuel in the fuel chamber is detected by the extendable member disposed therein.

In a fourth aspect of the present invention, there is provided a fuel amount detector including a fuel storage device that is provided with a fuel chamber for storing fuel, the fuel chamber changing its volume in accordance with a change in amount of fuel in the fuel chamber. In this fuel storage device, an extendable member is disposed in the fuel chamber, and a float member floating on fuel in the fuel chamber is attached to a portion of the extendable member. A portion of the extendable member that is located below the float member is attached to a portion of a member forming the fuel chamber. An amount of fuel in the fuel chamber is detected based on relative displacement between the float member and the portion of the extendable member that is attached to the portion of the member forming the fuel chamber. Therefore, the float member floats on the surface of liquid fuel in the fuel chamber.

According to the first through fourth aspects of the present invention, even when one of the at least two portions is displaced much more greatly than the other, it is possible to precisely detect an amount of fuel in the fuel chamber.

According to the third and fourth aspects of the present invention, the amount of fuel in the fuel chamber is detected using the extendable member disposed therein. Therefore, means for detecting an amount of fuel in the fuel chamber need not be disposed outside the fuel chamber, whereby the fuel storage device becomes compact. Since the aforementioned member is extendable, it does not prevent the fuel chamber from changing its inner volume.

According to the fourth aspect of the present invention, the float member floats on the surface of liquid fuel in the fuel chamber. Thus, the present invention makes it possible to precisely detect an amount of fuel in the fuel chamber even when the surface of liquid fuel is formed therein.

In a fifth aspect of the present invention, there is provided a fuel amount detector including a fuel storage device that is provided with a fuel chamber whose inner volume changes in accordance with an amount of fuel stored therein and an auxiliary fuel chamber whose inner volume does not change in accordance with an amount of fuel stored therein. The auxiliary fuel chamber is connected to a lower area of the fuel chamber. In this fuel amount detector, an amount of fuel in the fuel chamber is detected based on a change in level of the surface of liquid fuel in the auxiliary fuel chamber, which changes according to an amount of fuel in the fuel chamber. Namely, the amount of fuel is detected based on displacement of the surface of liquid fuel formed in the auxiliary chamber whose inner volume does not change in accordance with an amount of fuel stored therein.

In the fifth aspect of the present invention, the fuel amount detector may include a float for detecting a level of the surface of liquid fuel in the auxiliary fuel chamber. In this case, the fuel amount detector detects an amount of fuel in the fuel chamber based on a level of the surface of liquid fuel in the auxiliary fuel chamber detected by the float.

In a sixth aspect of the present invention, the following features are added to the fifth aspect of the present invention. That is, an amount of fuel in the fuel chamber is detected based on a pressure in the auxiliary fuel chamber that changes in accordance with a change of the surface of liquid fuel in the auxiliary fuel chamber. Namely, the amount of fuel in the fuel chamber is detected based on a change of pressure in the auxiliary fuel chamber, whose inner volume does not change in accordance with a change in fuel amount in the fuel chamber.

According to the fifth and sixth aspects of the present invention, the amount of fuel in the fuel chamber is detected based on displacement of a surface of liquid fuel formed in the auxiliary fuel chamber whose volume does not change in accordance with an amount of fuel stored. Since the inner volume of the fuel chamber changes in accordance with the amount of fuel in the fuel chamber, there is no surface of liquid fuel formed in the fuel chamber. Thus, the amount of fuel in the fuel chamber cannot be detected based on the surface of liquid fuel therein. However, the present invention makes it possible to detect an amount of fuel in the fuel chamber based on a surface of liquid fuel in the auxiliary fuel chamber that is connected to the fuel chamber and displaced in accordance with an amount of fuel therein.

In the aforementioned sixth aspect, the fuel amount detector may further include a pressure sensor for detecting a pressure in the fuel chamber. Furthermore, the auxiliary fuel chamber may be provided with a gas storage portion that communicates with the auxiliary fuel chamber. In this case, the pressure sensor detects a pressure of gas in the gas storage portion, and the fuel amount detector detects an amount of fuel in the fuel chamber based on a pressure of gas in the gas storage portion that is detected by the pressure sensor.

In the aforementioned aspect of the present invention, the auxiliary fuel chamber may be provided with a gas discharging pipe through which gas is discharged from the auxiliary fuel chamber. In this case, an opening end of the gas discharging pipe on the side of the auxiliary fuel chamber terminates at a location lower than the upper wall of the auxiliary fuel chamber.

In the aforementioned aspect of the present invention, the auxiliary fuel chamber may be provided with a gas discharging pipe through which gas is discharged from the auxiliary fuel chamber. In this case, an opening end of the gas discharging pipe on the side of the auxiliary fuel chamber terminates at a location corresponding to the upper wall of the auxiliary fuel chamber. The pressure sensor is provided with a pressure sampling pipe that extends further below from the upper wall of the auxiliary fuel chamber and detects a pressure of gas stored in the pressure sampling pipe. The fuel amount detector detects an amount of fuel in the fuel chamber based on a pressure of gas detected by the pressure sensor.

According to a seventh aspect of the present invention, there is provided a fuel amount detector including a fuel storage device that is provided with a fuel chamber for storing fuel. The fuel chamber changes its volume in accordance with an amount of fuel in the fuel chamber. The fuel amount detector further includes a fuel supplying pipe that communicates with the fuel chamber and serves to fill the fuel chamber with fuel, and a liquid surface sensor for detecting a level of the surface of liquid fuel in the fuel supplying pipe. In this fuel amount detector, an amount of fuel in the fuel chamber is detected based on a level of the surface of liquid fuel in the fuel supplying pipe detected by the liquid surface sensor.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
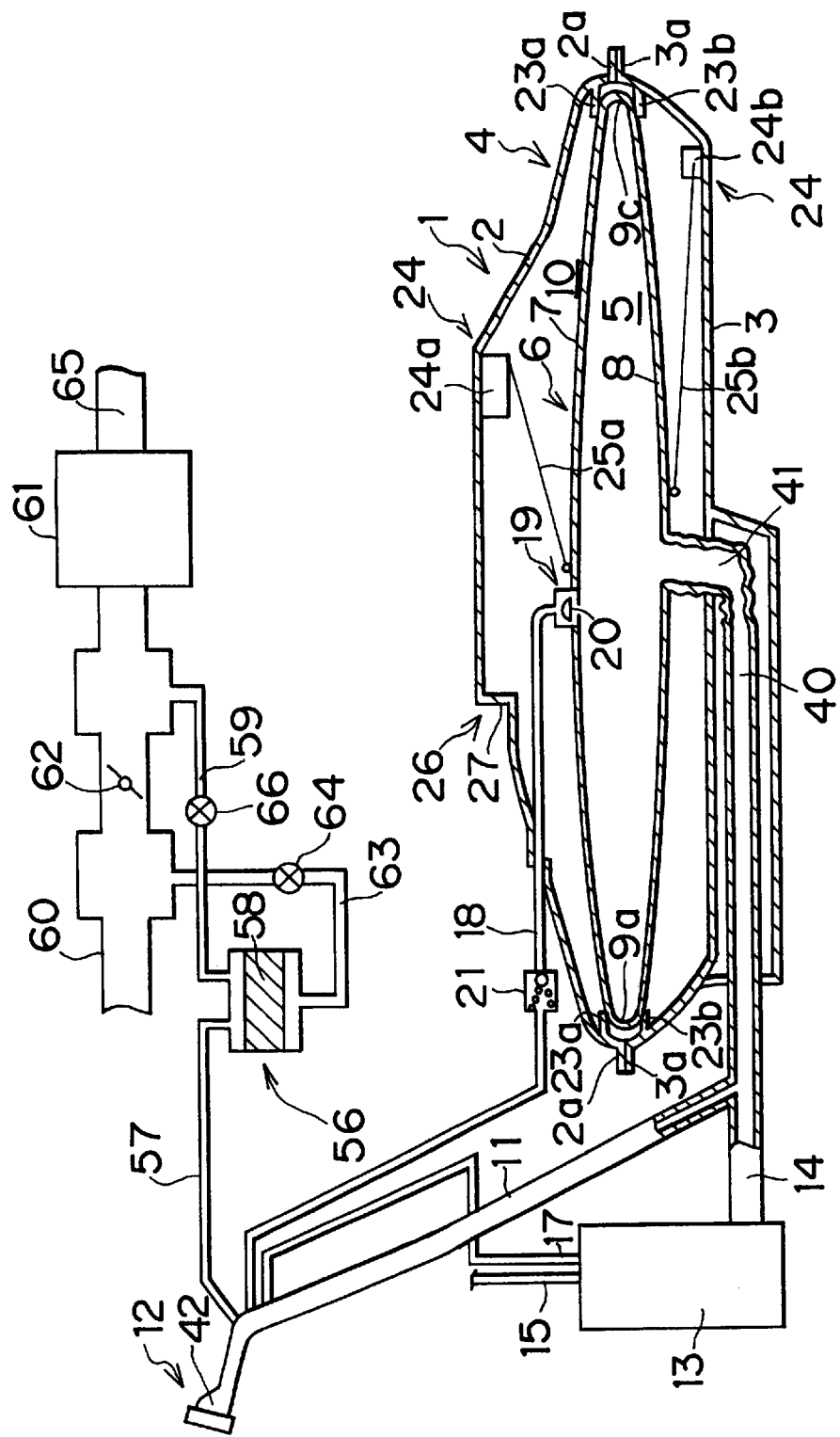
FIG. 1 shows a fuel storage device that is provided with a fuel indicator according to a first embodiment of the present invention.

A fuel storage device provided with a fuel indicator according to a first embodiment of the present invention will be described with reference to the accompanying drawings. A fuel storage device 1 shown in FIG. 1 is used as, for example, a tank for storing fuel that is to be supplied to an internal combustion engine. The fuel storage device 1 may also be used as a tank for merely storing fuel. Referring to FIG. 1, the fuel storage device 1 has a housing 4 that is substantially made up of a generally cup-shaped upper portion 2 and a generally cup-shaped lower portion 3. The upper portion 2 and the lower portion 3 are joined at their first flanges 2a, 3a formed around their peripheries. The housing 4 contains a fuel container or fuel tank 6 that defines a fuel chamber 5 therein for storing fuel. A second flange 23a protrudes inwards from an inner wall surface of the upper portion 2. Also, a second flange 23b protrudes inwards from an inner wall surface of the lower portion 3. Interposed between the second flanges 23a, 23b is a connecting portion that connects side walls 9a–9d of the fuel tank 6 to an upper wall 7 and a lower wall 8. Thereby the fuel tank 6 is held in the housing 4 such that the upper wall 7 and the lower wall 8 are vertically displaceable.

Figure 2:
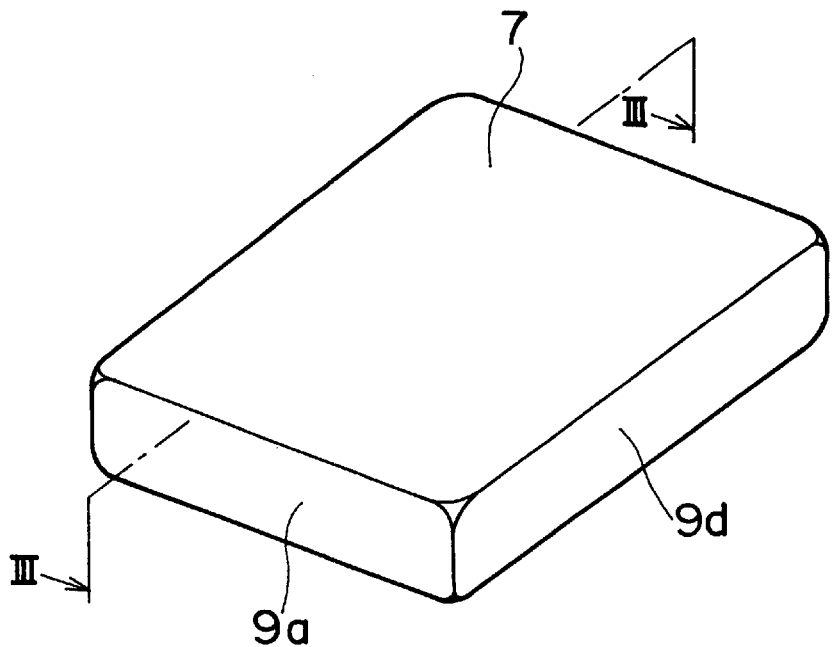
FIG. 2 is a perspective view of a fuel tank of the first embodiment.
Figure 3:
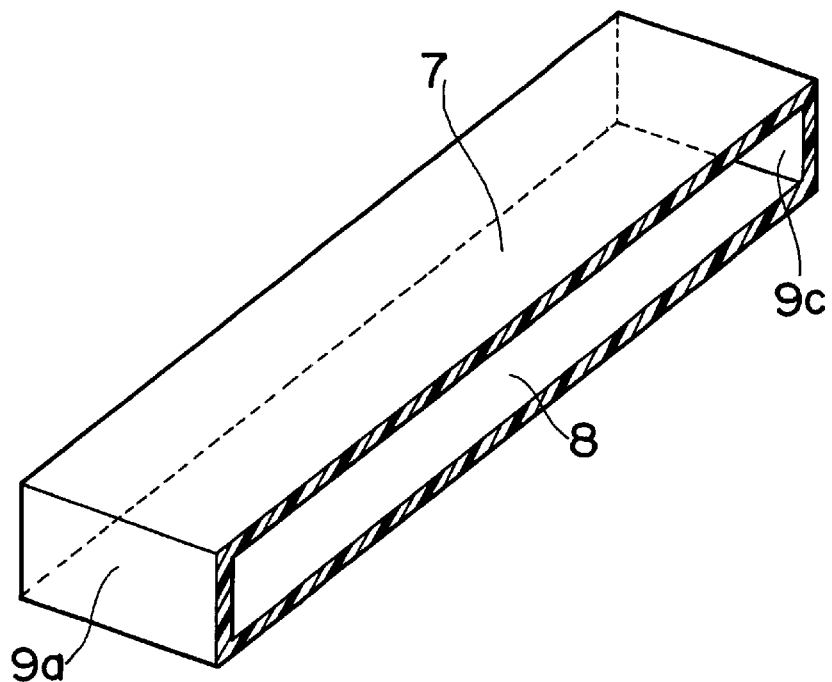
FIG. 3 is a perspective view of a cross section of the fuel tank taken along line III—III in FIG. 2.

Referring to FIGS. 2 and 3, the fuel tank 6 in the first embodiment has the generally rectangular upper wall 7 and the generally rectangular lower wall 8 that are disposed in a vertical relationship to each other, and the generally rectangular four side walls 9a–9d that connect the corresponding sides of the upper and lower walls 7, 8. Each of the side walls 9a–9d is connected at its opposite edges to adjacent side walls. The fuel tank 6 thus has a generally rectangular parallelepiped shape, and defines the fuel chamber 5 therein. Therefore, each wall of the fuel tank 6 corresponds to a partition that divides the interior space of the fuel storage device 1 into the fuel chamber 5 and an air chamber 10. Each of the upper and lower walls 7, 8 and the side walls 9a–9d has a multi-layer structure formed by covering the opposite surfaces of a flat core portion formed from a nylon or a copolymer resin of ethylene and vinyl, with skin portions formed from a high-density polyethylene. The upper and lower walls 7, 8 and the side walls 9a–9d are substantially rigid. The area of each of the upper wall 7 and the lower wall 8 of the fuel tank 6 is larger than the area of one of the side walls 9a–9d. The rigidity of the upper and lower walls 7, 8 is lower than the rigidity of the side walls 9a–9d. The general shape of the upper and lower walls 7, 8 is not limited to a rectangle, but may also be any other polygon. That is, the shapes of the upper and lower walls 7, 8 and the side walls 9a–9d may be suitably selected in accordance with the shape of a space in which the fuel tank 6 is disposed.

Figure 4:
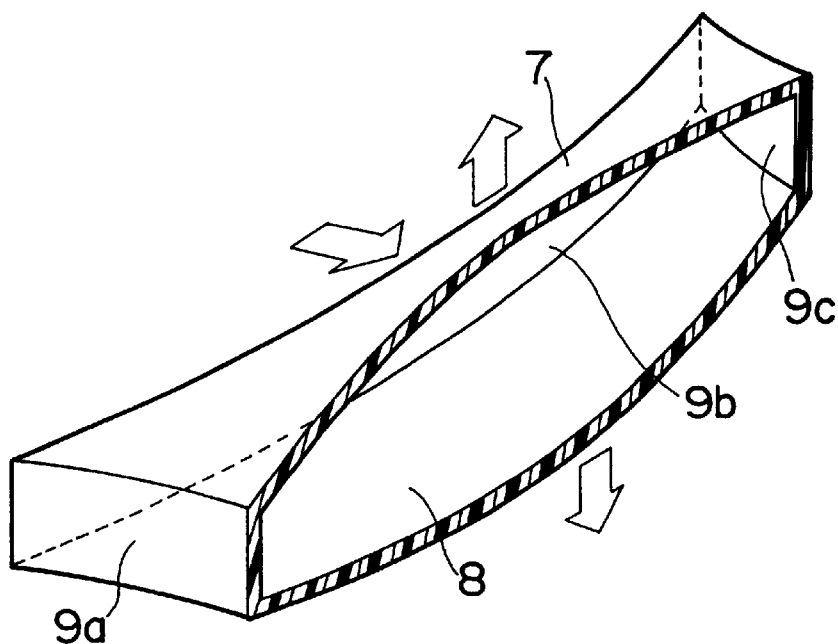
FIG. 4 is similar to FIG. 3 but is a perspective view of a cross section of the fuel tank when the fuel tank contains more than a predetermined amount of fuel.

As shown in FIG. 4, when fuel is supplied into the fuel tank 6 in an amount exceeding a normal maximum amount of fuel that can be stored in the fuel tank 6 while the generally rectangular parallelepiped shape of the fuel tank 6 is retained (hereinafter, referred to as "predetermined amount"), the upper wall 7 and the lower wall 8 curve or expand outwards so as to separate from each other, and the side walls 9a–9d curve or sink inwards so as to come closer to one another. That is, in the first embodiment, when the amount of fuel in the fuel tank 6 exceeds the predetermined amount, the upper wall 7 and the lower wall 8 are displaced upwards and downwards, respectively, and the side walls 9a–9d are displaced horizontally inwards. In this manner, the amount of fuel storable in the fuel tank 6 gradually increases. The amount of deformation of the upper and lower walls 7, 8 is normally greater than the amount of deformation of the side walls 9a–9d.

Figure 5:
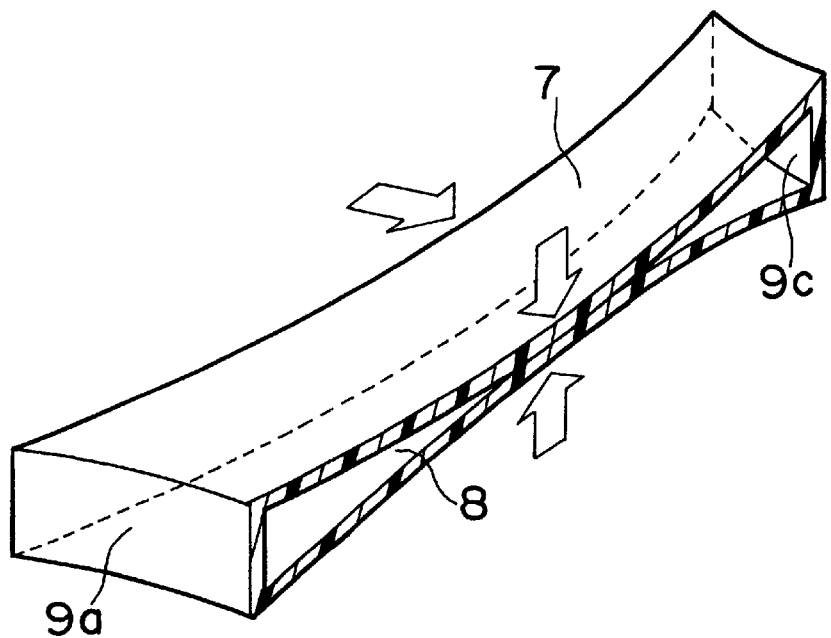
FIG. 5 is similar to FIG. 3 but is a perspective view of a cross section of the fuel tank when the fuel tank contains less than the predetermined amount of fuel.

Conversely, as shown in FIG. 5, when fuel is discharged from the fuel tank 6 so that the amount of fuel remaining in the fuel tank 6 becomes less than the predetermined amount, the upper and lower walls 7, 8 curve or dent inwards so as to come closer to each other, and the side walls 9a–9d curve or dent inwards so as to come closer to each other. That is, in the first embodiment, when the amount of fuel in the fuel tank 6 becomes less than the predetermined amount, the upper wall 7 and the lower wall 8 are displaced downwards and upwards, respectively, and the side walls 9a–9d are displaced horizontally inwards. In this manner, the amount of fuel storable in the fuel tank 6 gradually decreases.

Referring back to FIG. 1, an opening 26 is formed in the upper portion 2. A filter 27 is inserted into the opening 26. Therefore, the air chamber 10 is in communication with the atmosphere via the filter 27. Thus, when the upper and lower walls 7, 8 of the fuel tank 6 are displaced outwards, air in the air chamber 10 flows to the outside via the filter 27. Conversely, when the upper and lower walls 7, 8 of the fuel tank 6 are displaced inward, air flows into the air chamber 10 via the filter 27. In this manner, due to the presence of the opening 26, the upper and lower walls 7, 8 of the fuel tank are easily displaced within the housing 4.

A fuel supplying pipe 11 for supplying fuel into the fuel tank 6 is connected at its lower end 40 to a substantially intermediate portion of the lower wall 8 of the fuel tank 6 via an extendable pipe 41. The extendable pipe 41 has a bellows-like pipe wall of an undulate cross-section. Therefore, when the amount of fuel in the fuel tank 6 increases and the lower wall 8 is displaced downwards, the extendable pipe 41 contracts. On the other hand, when the amount of fuel in the fuel tank 6 decreases and the lower wall 8 is displaced upwards, the extendable pipe 41 extends. An upper end 42 of the fuel supplying pipe 11 is provided with a removable cap 12 for closing the fuel supplying pipe 11. When fuel is to be supplied into the fuel tank 6, the cap 12 is removed, so that fuel can be supplied into the fuel tank 6 via the upper end 42 of the fuel supplying pipe 11.

A fuel introducing pipe 14 for introducing fuel from the fuel tank 6 into a fuel pump device 13 is connected at one end thereof to an intermediate portion of the fuel supplying pipe 11. The other end of the fuel introducing pipe 14 is connected to the fuel pump device 13. A fuel pump (not shown) is disposed in the fuel pump device 13. The fuel pump supplies fuel from the fuel pump device 13 to an engine body (not shown) via a fuel supplying pipe 15. Further, a gas discharging pipe 17 for discharging gas from the fuel pump device 13 into the fuel supplying pipe 11 is connected at one end thereof to the fuel pump device 13. The other end of the gas discharging pipe 17 is connected to the upper portion 42 of the fuel supplying pipe 11. When fuel is introduced from the fuel tank 6 into the fuel pump device 13, gas is discharged from the fuel pump device 13 into the fuel supplying pipe 11 via the gas discharging pipe 17. As a result, fuel can be easily introduced into the fuel pump device 13.

A tank fuel vapor discharging pipe 18 for discharging gas, more particularly, fuel vapor, out of the fuel tank 6 is connected at one end thereof to a substantially central portion of the upper wall 7 of the fuel tank 6, via a shutoff valve 19. The other end of the tank fuel vapor discharging pipe 18 is connected to the fuel supplying pipe 11. The tank fuel vapor discharging pipe 18 is flexible so as to follow the displacement of the upper wall 7 of the fuel tank 6. An upper portion of the fuel supplying pipe 11 is connected to a charcoal canister 56 via a canister pipe 57. The charcoal canister 56 contains activated carbon 58, which temporarily adsorbs and retains fuel vapor. The charcoal canister 56 is connected to an intake pipe 60 via a purge pipe 59. The intake pipe 60 is connected to an engine body 61. A throttle valve 62 for adjusting an amount of air to be introduced into the engine body 61 is disposed in the intake pipe 60. The purge pipe 59 is connected to the intake pipe 60 at a location downstream of the throttle valve 62. The purge pipe 59 is equipped with a purge control valve 66 for shutting off the purge pipe 59. The charcoal canister 56 is connected on the opposite side of the purge pipe 59 to the intake pipe 60 at a location upstream of the throttle valve 62, via an air passage. The air passage 63 is equipped with a second shutoff valve 64 for shutting off the air passage 63. An exhaust passage 65 is connected to the engine body 61. Therefore, fuel vapor generated in the fuel supplying pipe 11 is temporarily retained by the charcoal canister 56. When the purge control valve 66 and the second shutoff valve 64 are opened, a negative pressure generated in the intake pipe 60 during operation of the engine is introduced into the charcoal canister 56 via the purge pipe 59. In this manner, fuel vapor in the charcoal canister 56 is purged to the intake pipe 60 and processed.

The shutoff valve 19 has a float 20 that is floatable on liquid fuel. When the surface of liquid fuel in the fuel tank 6 reaches the float valve 19, the float 20 rises to close an opening of the tank fuel vapor discharging pipe 18. Thus, the float valve 19 prevents fuel from leaking out of the fuel tank 6. The tank fuel vapor discharging pipe 18 is equipped with a check valve 21. The check valve 21 opens when the pressure in a portion of the tank fuel vapor discharging pipe 18 between the check valve 21 and the float valve 19 becomes higher than a predetermined positive pressure level. The check valve 21 closes when the pressure becomes lower than the predetermined positive pressure level. Therefore, once the float valve 19 is closed, gas, such as air, fuel vapor or the like, will not enter the fuel tank 6.

Next, the fuel indicator according to the first embodiment will be explained. The fuel indicator of the first embodiment is provided with a first fuel gauge 24a attached to the inner surface wall of the upper portion 2 of the housing 4 and a second fuel gauge 24b attached to the inner wall surface of the lower portion 3. The first fuel gauge 24a has a first measuring arm 25a abutting on a substantially central outer wall surface of the upper wall 7 of the fuel tank 6. That is, an end portion of the first measuring arm 25a abutting on the upper wall 7 is displaced following deformation of the upper wall 7. The first fuel gauge 24a detects a position of the upper wall 7 in the housing 4 based on an amount of displacement of the end portion of the first measuring arm 25a. On the other hand, the second fuel gauge 24b has a second measuring arm 25b abutting on a substantially central outer wall surface of the lower wall 8 of the fuel tank 6. That is, the second fuel gauge 24b detects a position of the lower wall 8 in the housing 4 based on an amount of displacement of an end portion of the second measuring arm 25b abutting on the lower wall 8. The fuel indicator of the first embodiment calculates an amount of fuel in the fuel tank 6 based on a difference in positions of the upper and lower walls 7, 8.

For example, in a fuel indicator detecting an amount of fuel in a fuel tank based on an amount of displacement of a portion of the fuel tank (hereinafter, referred to as a detection portion) that is displaced in accordance with an amount of fuel, when the amount of displacement of the aforementioned detection portion is small despite a large amount of displacement of other portions of the fuel tank, it is impossible to precisely calculate an amount of fuel in the fuel tank. In particular, according to a construction of the fuel tank of this embodiment wherein the upper and lower walls 7, 8 are displaced, the lower wall 8 is displaced more greatly than the upper wall 7 owing to the weight of fuel. Therefore, with a conventional method that is based merely on displacement of the upper wall 7, the amount of fuel cannot always be detected correctly. Conversely, in the fuel indicator of the first embodiment, the amount of fuel in the fuel tank 6 is detected based on positions of two portions of the fuel tank 6 that are displaced in accordance with an amount of fuel, that is, on positions of the central portions of the upper and lower walls 7, 8. Consequently, even if one of the upper and lower walls 7, 8 is displaced more greatly than the other, it is possible to precisely calculate an amount of fuel in the fuel tank 6 based on amounts of displacement of both the walls 7, 8.

As described above, the fuel tank 6 of the first embodiment has a rectangular parallelepiped shape, and is always displaced in a substantially constant direction. In other words, even when fuel flows out of the fuel tank 6 due to oscillation thereof, the fuel tank 6 is displaced in the aforementioned constant direction. Hence, according to the first embodiment, even if the fuel tank oscillates, the amount of fuel in the fuel tank can be calculated precisely.

In the first embodiment, the amount of fuel is calculated based on positions of the central portions of the upper and lower walls. However, it is also possible to calculate an amount of fuel based on positions of peripheral portions of the upper and lower walls. Instead of the measuring arms, an optical sensor for optically detecting positions of the upper and lower walls, a magnetic sensor for magnetically detecting positions of the upper and lower walls, an acoustic sensor for acoustically detecting positions of the upper and lower walls and the like may also be employed. Basically, the portions of the walls of the fuel tank to be detected have only to be different from each other in direction and amount of displacement.

Next, a fuel indicator according to a second embodiment of the present invention will be explained. In the first embodiment, the amount of fuel in the fuel tank is calculated based on a position of the upper wall detected by the first measuring arm and a position of the lower wall detected by the second measuring arm. However, this case requires execution of a processing for calculating an amount of fuel from positions of the upper and lower walls. Therefore, the second embodiment makes it possible to detect an amount of fuel in the fuel tank without necessitating execution of the processing for calculating an amount of fuel from values detected by the fuel indicator.

Figure 6:
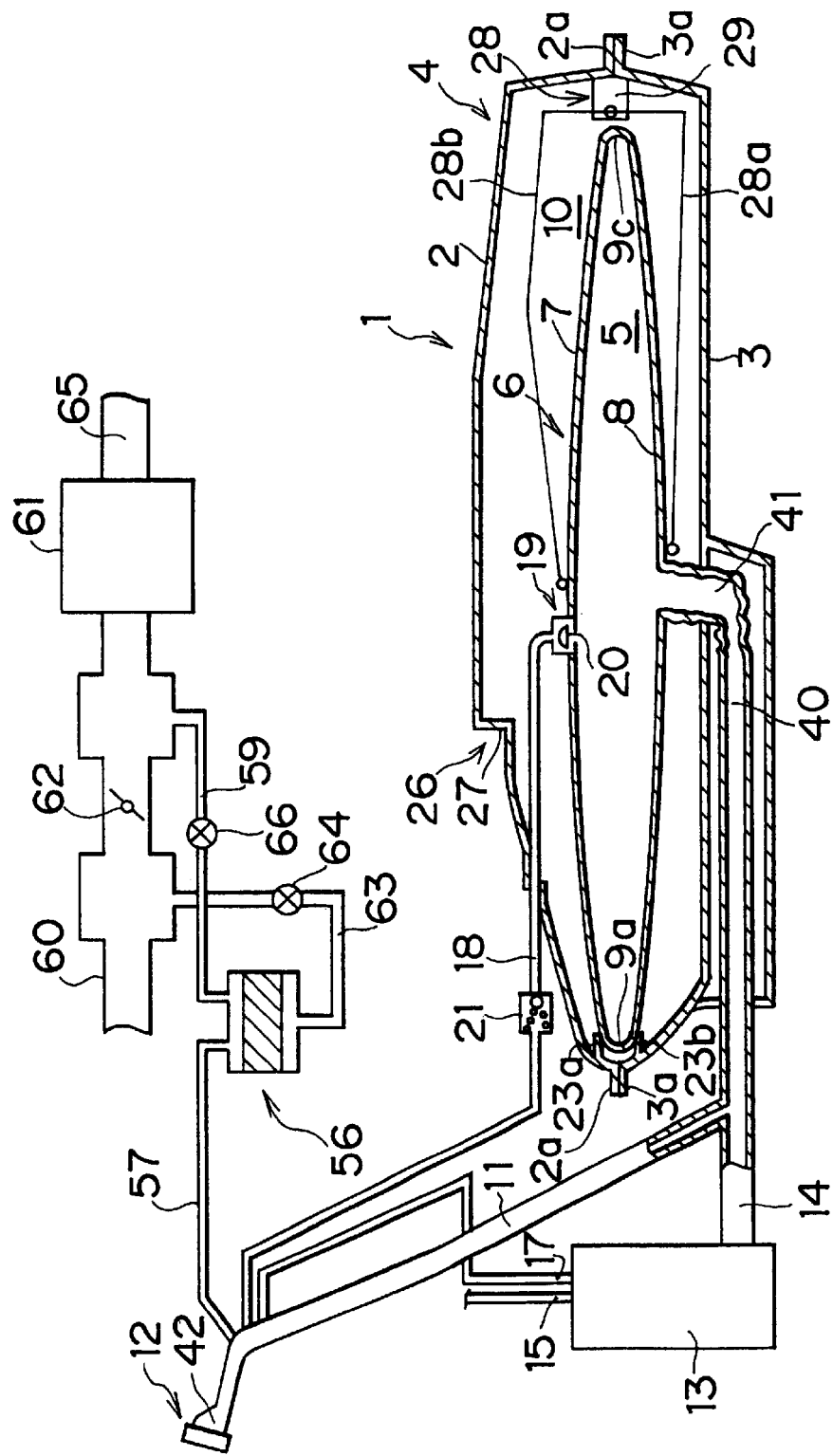
FIG. 6 shows a fuel storage device that is provided with a fuel indicator according to a second embodiment of the present invention.

As shown in FIG. 6, a fuel indicator 28 of the second embodiment has a reference arm 28a and a detecting arm 28b. The reference arm 28a and the detecting arm 28b are attached to a common attachment member 29. The end portion of the reference arm 28a abuts on the substantially central outer wall surface of the lower wall 8 of the fuel tank 6. On the other hand, the end portion of the detecting arm 28b abuts on the substantially central outer wall of the upper wall 7 of the fuel tank 6. The attachment member 29 detects an amount of fuel in the fuel tank 6 based on a position of the detecting arm 28b with respect to the reference arm 28a. Therefore, the second embodiment makes it possible to detect an amount of fuel in the fuel tank without necessitating a processing for calculating the amount of fuel from values detected by the fuel indicator. The construction of the second embodiment is the same as that of the first embodiment in other respects, and therefore will not be described.

Next, a fuel indicator according to a third embodiment of the present invention will be described. In the first embodiment, the first and second fuel gauges are attached to the interior of the housing. As a result, the housing needs to have a large volume, which leads to enlargement of the fuel storage device. Therefore, the third embodiment makes it possible to minimize a space in which the fuel indicator is disposed.

Figure 7:
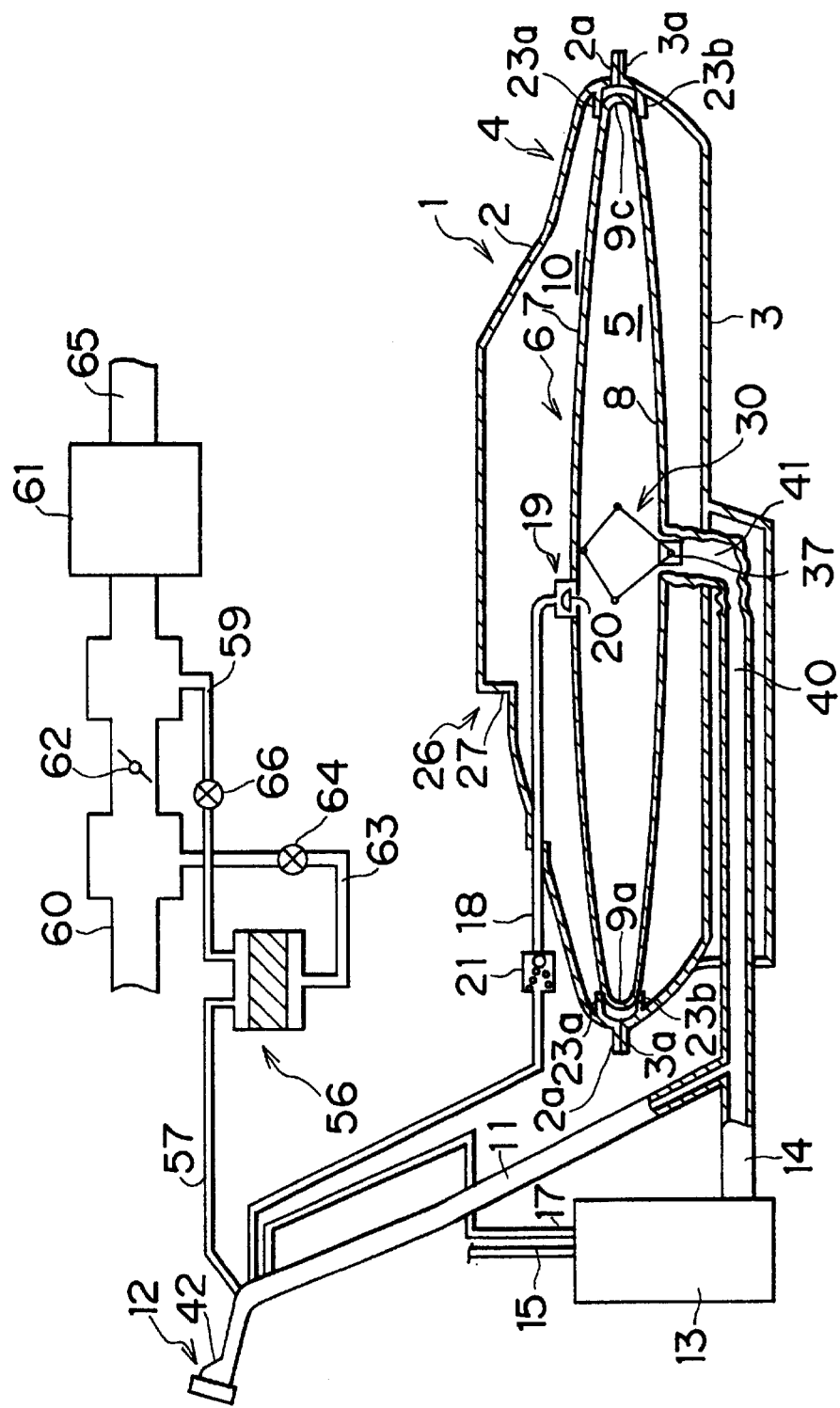
FIG. 7 shows a fuel storage device that is provided with a fuel indicator according to a third embodiment of the present invention.
Figure 8:
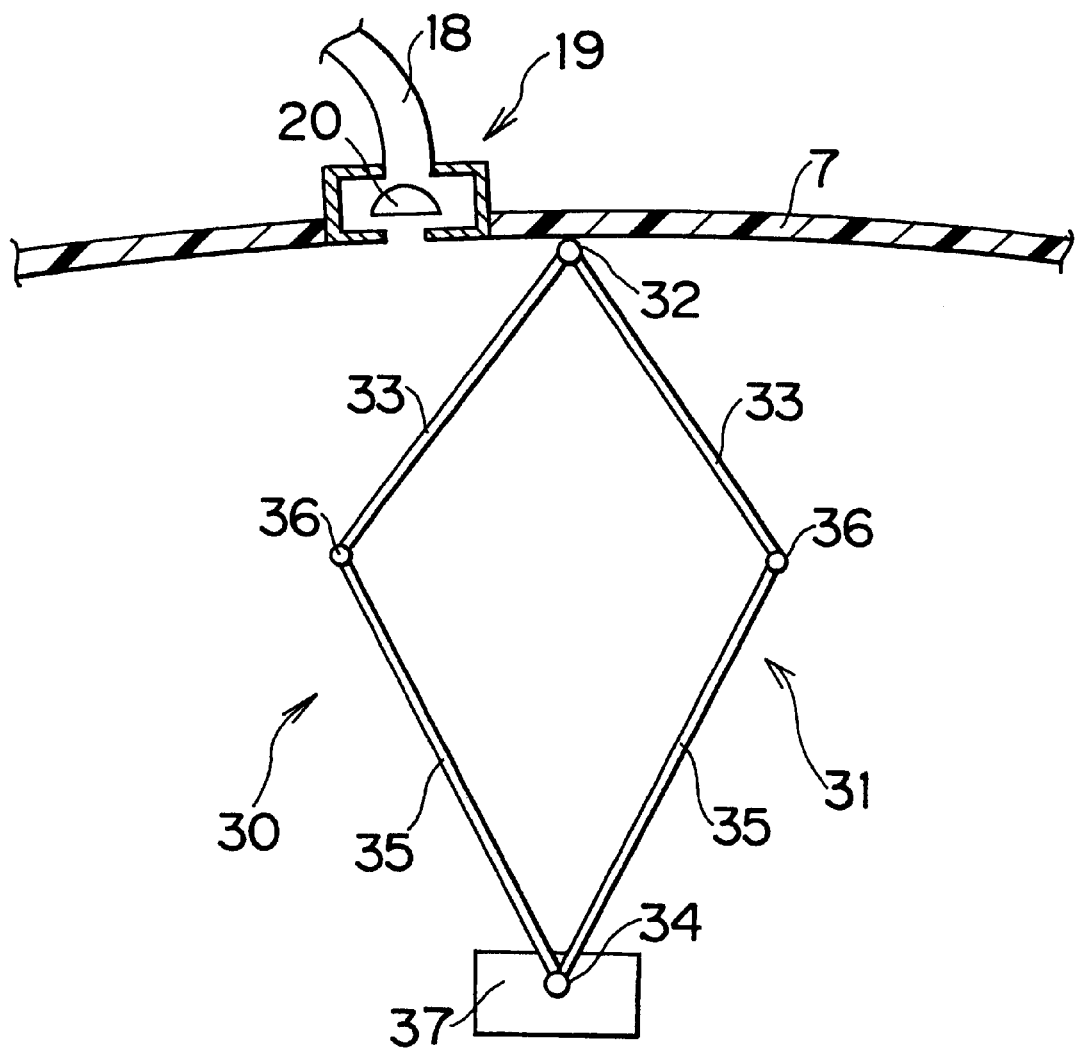
FIG. 8 shows the fuel indicator according to the third embodiment of the present invention.

As shown in FIG. 7, a fuel indicator 30 of the third embodiment is disposed in the fuel tank 6. As shown in FIG. 8 in detail, the fuel indicator 30 is provided with a link mechanism 31. The link mechanism 31 has two upper arms 33 rotatably joined to each other at an upper joint 32 and two lower arms 35 rotatably joined to each other at a lower joint 34. The upper arms 33 and the lower arms 35 are rotatably connected to each other at intermediate joints 36. The link mechanism 31 is attached to an attachment member 37 at the lower joint 34. The attachment member 37 is attached to the extendable pipe 41 so as not to prevent the extendable pipe 41 from extending and contracting or the lower wall 8 of the fuel tank 6 from moving upwards and downwards. The link mechanism 31 abuts on the inner wall surface of the upper wall 7 of the fuel tank 6 at the upper joint 32. The upper joint 32 of the link mechanism 31 is urged upwards so that upon upward displacement of the upper wall 7, the upper joint 32 follows the displacement of the upper wall 7. The attachment member 37 has not only the function of attaching the link mechanism 31 to the fuel tank 6 but also the functions of detecting an angle between the lower arms 35 and outputting a voltage corresponding to the detected angle. The construction of the fuel storage device of the third embodiment is the same as that of the first embodiment in other respects, and therefore will not be described.

In the third embodiment, when the fuel level in the fuel tank 6 rises and the lower wall 8 is displaced outwards, the attachment member 37 is displaced downwards following the displacement of the extendable pipe 41, which has followed the displacement of the lower wall 8 of the attachment member 37. When the fuel level in the fuel tank 6 rises and the upper wall 8 is displaced outwards, the upper joint 32 is displaced upwards following the displacement of the upper wall 8. In other words, when the fuel level in the fuel tank 6 rises and the upper and lower walls 7, 8 are displaced outwards, the upper and lower joints 32, 34 are displaced so as to separate from each other. Simultaneously, the intermediate joints 36 are displaced horizontally so as to come closer to each other. Conversely, when the fuel level in the fuel tank 6 falls and the lower wall 8 is displaced inwards, the attachment member 37 is displaced upwards following the displacement of the lower wall 8, which has followed the displacement of the lower wall 8. When the fuel level in the fuel tank 6 falls and the upper wall 8 is displaced inwards, the upper joint 32 is displaced downwards following the displacement of the upper wall 8. In other words, when the fuel level in the fuel tank 6 falls and the upper and lower walls 7, 8 are displaced inwards, the upper and lower joints 32, 34 are displaced so as to come closer to each other. Simultaneously, the intermediate joints 36 are displaced horizontally so as to separate from each other. The link mechanism 31 is urged upwards such that the upper joint 34 always abuts on the upper wall 7 of the fuel tank 6.

Thus, the fuel indicator of the third embodiment detects an amount of fuel in the fuel tank 6 based on a positional relationship between the upper and lower joints 32, 34. In the third embodiment, the fuel indicator is disposed in the fuel tank so as not to prevent the walls of the fuel tank from being displaced. Therefore, the fuel storage device requires a small space in which the fuel indicator is disposed.

Next, a fuel indicator according to a fourth embodiment of the present invention will be explained. In the third embodiment, when the fuel tank contains fuel vapor, the inner wall surface of the upper wall does not coincide in position with the surface of liquid fuel in the fuel tank. For this reason, when the fuel tank contains fuel vapor, it is impossible to precisely detect an amount of fuel in the fuel tank. Therefore, the fourth embodiment makes it possible to precisely detect an amount of fuel in the fuel tank even when fuel vapor is contained therein.

Figure 9:
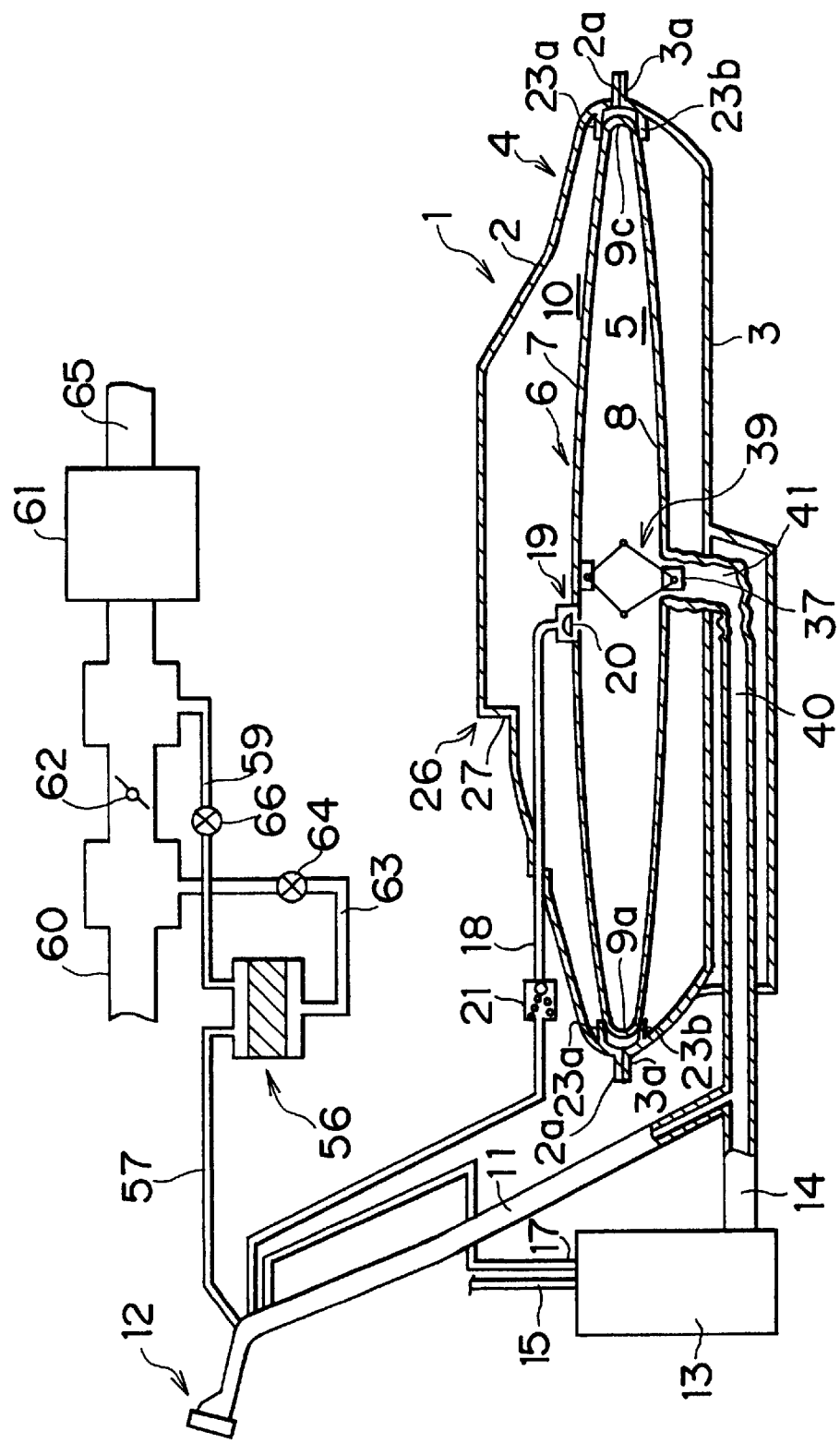
FIG. 9 shows a fuel storage device that is provided with a fuel indicator according to a fourth embodiment of the present invention.
Figure 10:
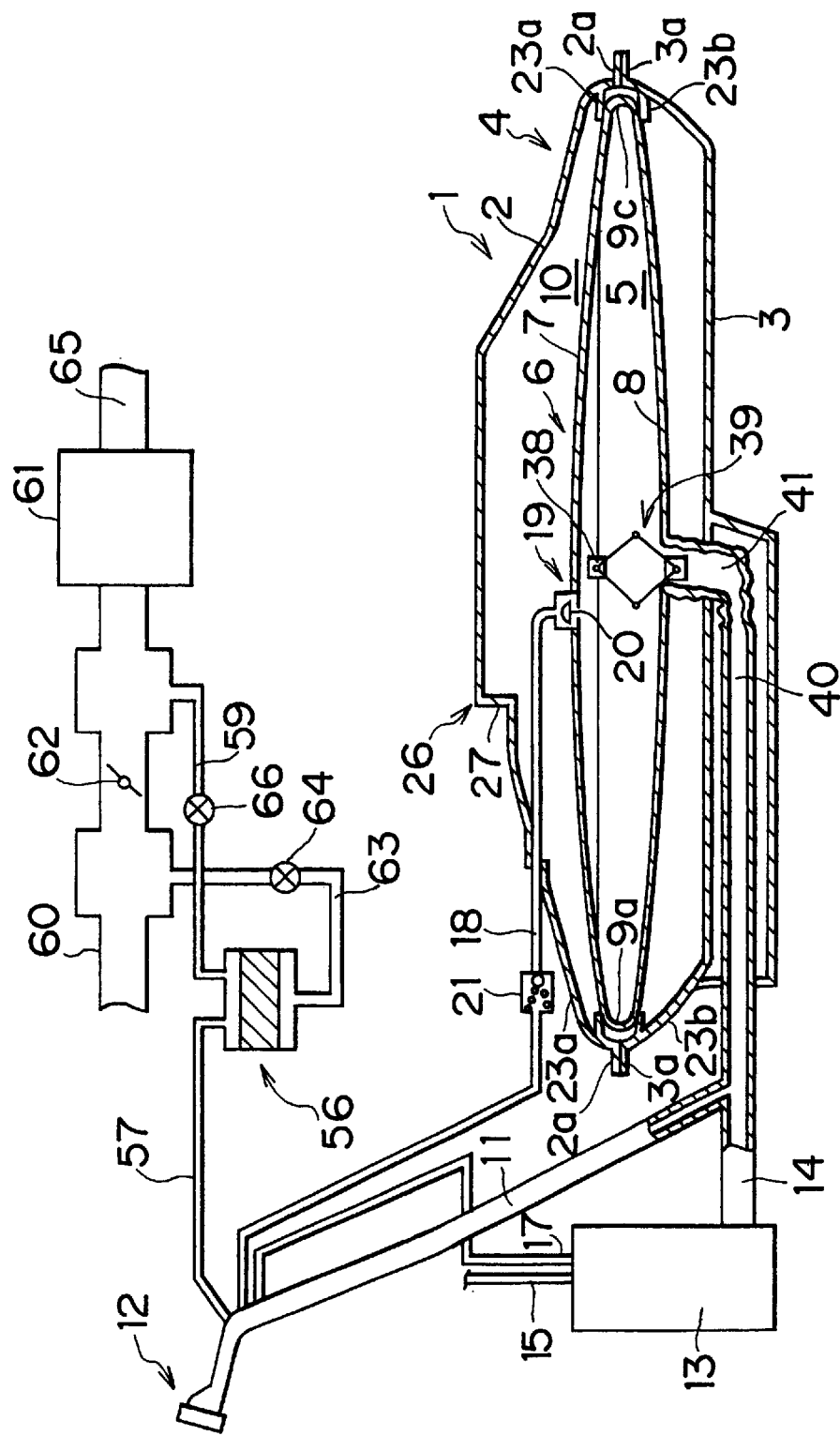
FIG. 10 is similar to FIG. 8 but shows a fuel storage device when a space is formed above the surface of liquid fuel in the fuel tank.
Figure 11:
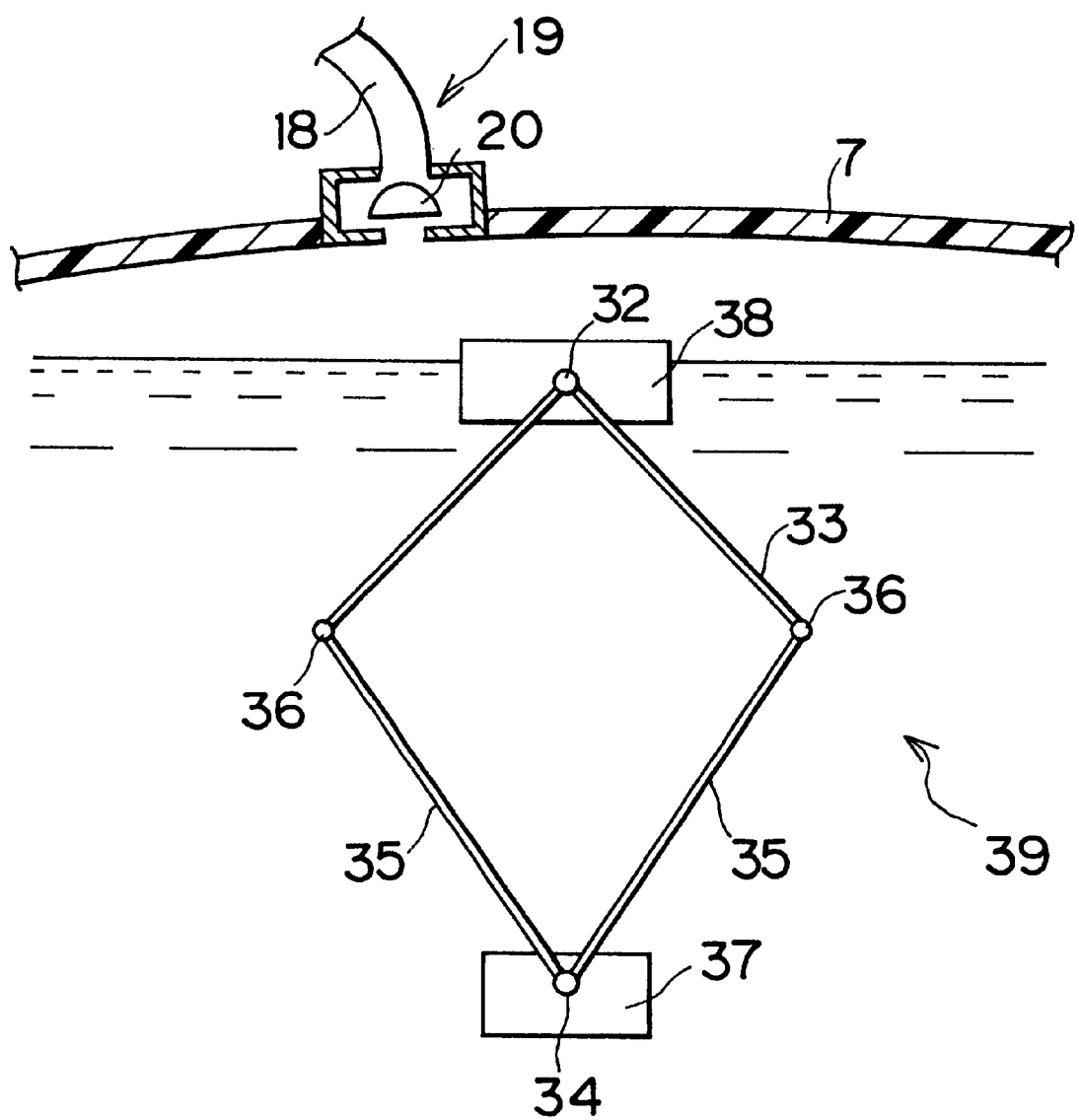
FIG. 11 shows a float of the fourth embodiment of the present invention.

As shown in FIGS. 9 through 11, in the fourth embodiment, the upper joint 32 is provided with a float 38 that is floatable on liquid fuel. The construction of the fourth embodiment is the same as that of the third embodiment in other respects, and therefore will not be described.

As shown in FIGS. 10 and 11, in the fourth embodiment, when the fuel tank 6 contains fuel vapor and the surface of liquid fuel in the fuel tank 6 does not coincide with the inner wall surface of the upper wall 7, the float 38 of the link mechanism 31 floats on the surface of liquid fuel in the fuel tank 6. Therefore, the position of the upper joint 32 precisely indicates where the surface of liquid fuel in the fuel tank 6 is located. Therefore, according to the fourth embodiment, even when the fuel tank contains gas including fuel vapor, it is possible to precisely detect an amount of fuel in the fuel tank.

When there is no space in the fuel chamber, the float 38 is constantly in close contact with the inner wall surface of the upper wall 7 of the fuel tank 6. Therefore, at least an upper face of the float 38 and the periphery thereof may be made of a deformable material that can be adapted to the shape of the deformed inner wall surface of the upper wall 7 so that the float 38 will indicate a precise position of the upper wall 7.

Next, a fuel indicator according to a fifth embodiment of the present invention will be explained. In the first embodiment, when the fuel tank has a minimum inner volume, fuel exists in the fuel tank. Therefore, in the first embodiment, once the fuel tank assumes its minimum inner volume, the amount of fuel in the fuel tank cannot be detected precisely until the fuel tank is evacuated. Therefore, the fifth embodiment makes it possible to precisely detect an amount of fuel in the fuel tank until the fuel tank is evacuated, after the fuel tank has assumed its minimum inner volume.

Figure 12:
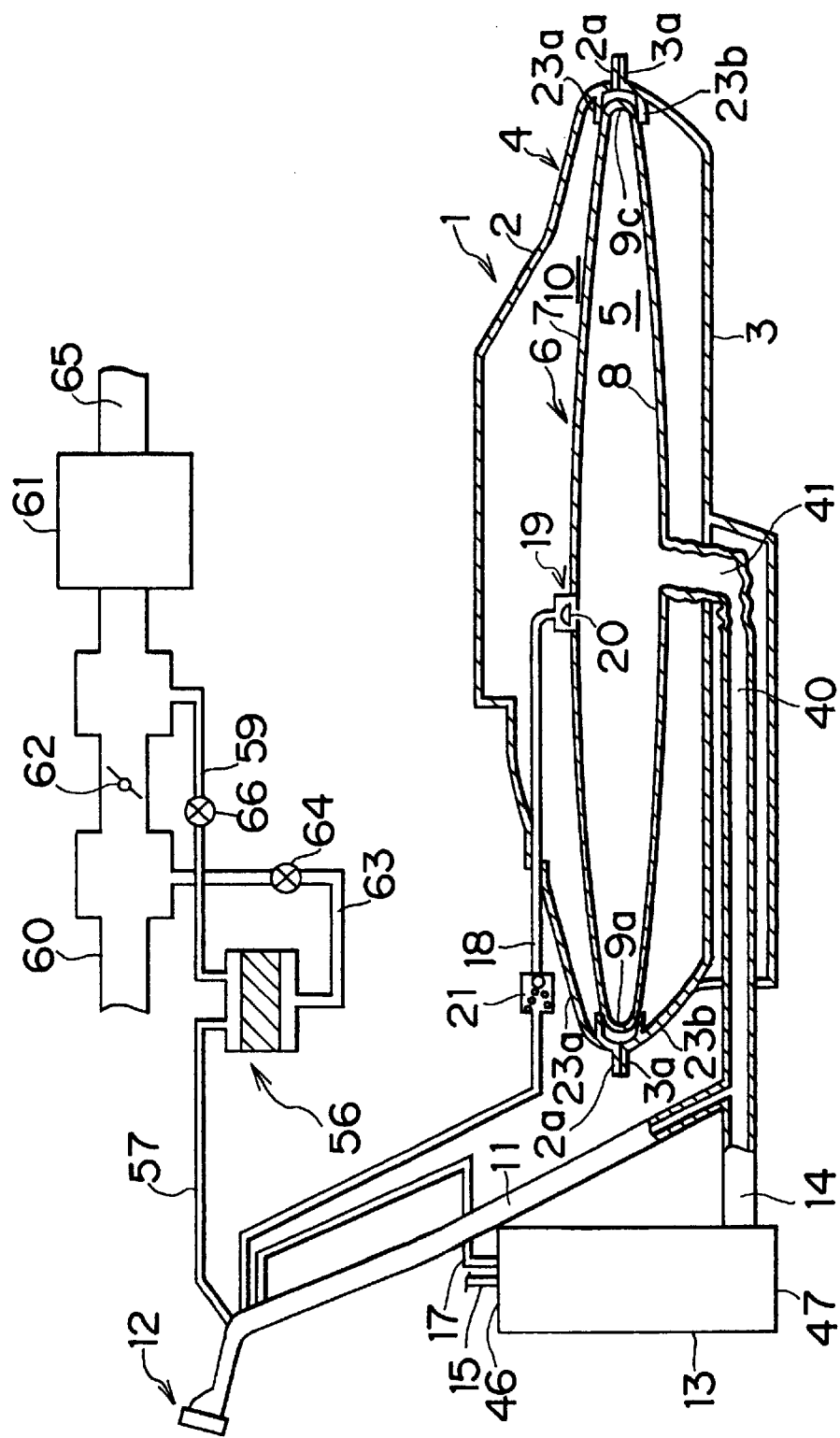
FIG. 12 shows a fuel storage device that is provided with a fuel indicator according to a fifth embodiment of the present invention.
Figure 13:
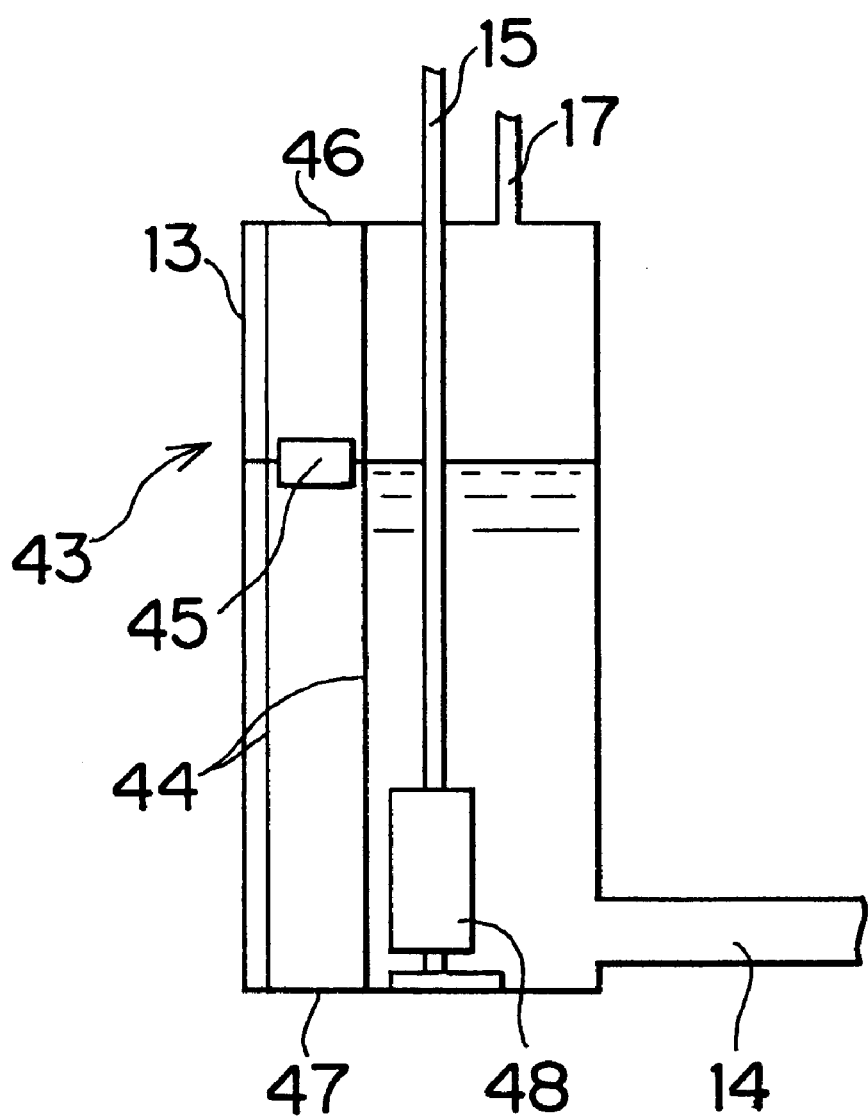
FIG. 13 is a cross-sectional view of a fuel pump device of the fifth embodiment.

As shown in FIGS. 12 and 13, in the fifth embodiment, a fuel indicator 43 is disposed in the fuel pump device 13 instead of the fuel indicator of the first embodiment. The fuel indicator 43 has a guide wall 44 that extends from an upper wall 46 to a lower wall 47 of the fuel pump device 13 and a float 45 that is movable upwards and downwards by being guided by the guide wall 44. As shown in FIG. 12, the upper wall 46 of the fuel pump device 13 is located higher than the upper wall 7 of the fuel tank 6 when the fuel tank 6 has a maximum inner volume. Accordingly, even when the fuel tank 6 assumes its maximum inner volume, the surface of liquid fuel is located lower than the inner wall surface of the upper wall 46. The lower wall 47 of the fuel pump device 13 is located lower than the lower wall 8 of the fuel tank 6 when the fuel tank 6 assumes its minimum inner volume. Therefore, the fuel contained in the fuel tank 6 is entirely introduced into the fuel pump device 13. A fuel pump 48 is disposed in the fuel pump device 13.

In the fifth embodiment, the float 45 of the fuel indicator 43 moves upwards or downwards in accordance with vertical movement of the surface of liquid fuel in the fuel tank device 13. The float 45 is movable from the lowermost portion to the uppermost portion of the fuel tank device 13, that is, from the lower wall 47 to the upper wall 46. Thus, it is possible to detect an amount of fuel stored in the fuel tank 6, which ranges from a maximum level to zero. The maximum amplitude of fuel at the time of oscillation of the fuel storage tank is smaller in the fuel pump device 13 than in the fuel tank 6. Therefore, as compared to the case of the first embodiment, the fifth embodiment makes it possible to detect more precisely an amount of fuel in the fuel tank 6 when fuel flows out due to the oscillation of the a fuel storage device. The fuel pump device 13 functions as a secondary fuel tank (subsidiary fuel tank) which is different from the fuel tank 6, and the space within the secondary fuel tank corresponds to an auxiliary fuel chamber. The position of the float 45 is detected based on contact of a contact point provided on the guide wall 44 with a contact point within the float. Furthermore, it is also possible to detect a position of the float based on a contact resistance between the float and the guide wall resulting from movement of the float or a change in magnetic flux around the float.

Next, a fuel indicator according to a sixth embodiment of the present invention will be explained. In the fifth embodiment, the upper wall of the fuel pump device needs to be higher than the upper wall of the fuel tank when the fuel tank assumes its maximum inner volume. Consequently, the fuel pump device is oversized. Therefore, the sixth embodiment makes it possible to minimize the size of a fuel pump device that includes a fuel indicator and is disposed in a fuel storage device.

Figure 14:
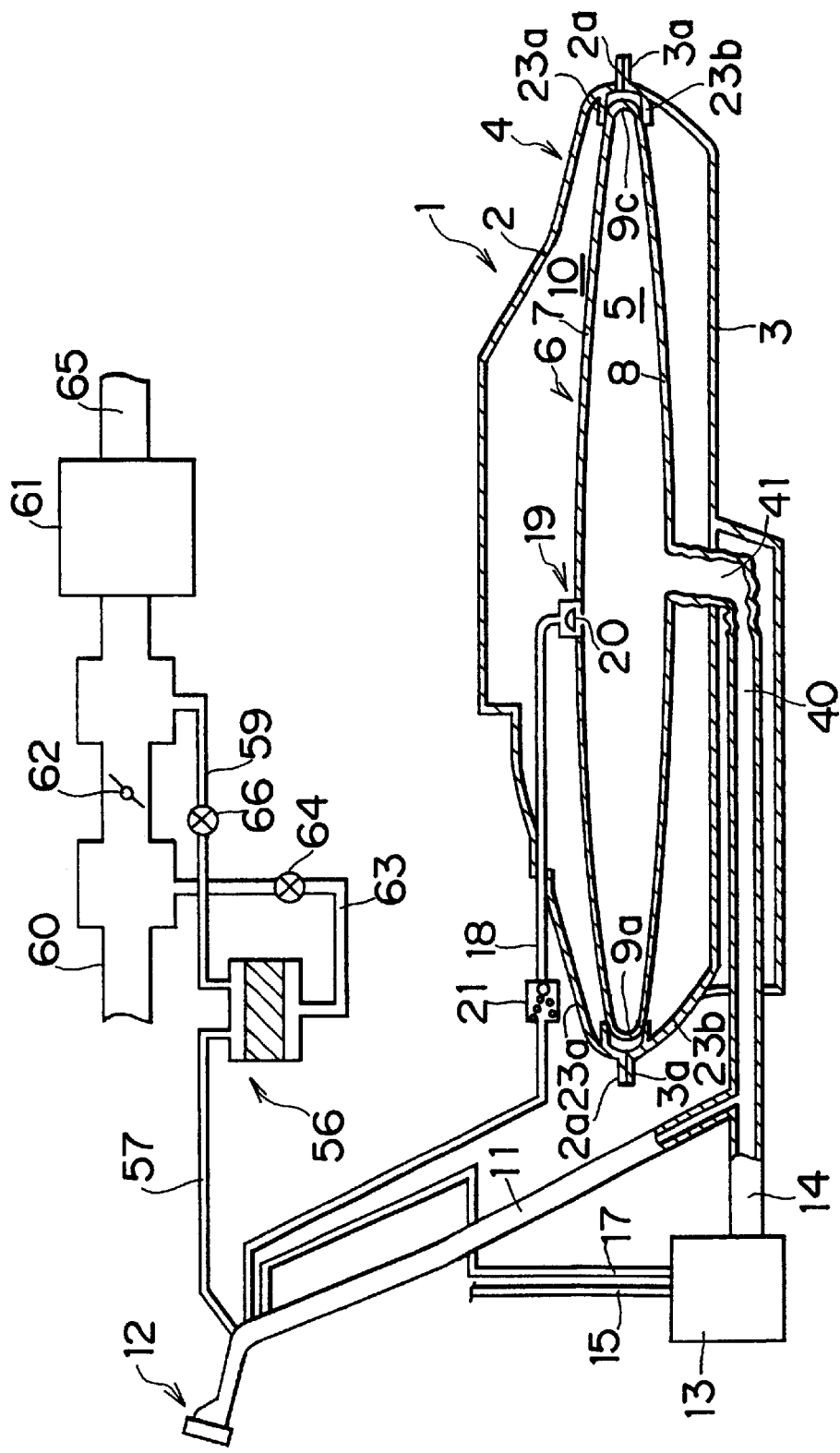
FIG. 14 shows a fuel storage device that is provided with a fuel indicator according to a sixth embodiment of the present invention.
Figure 15:
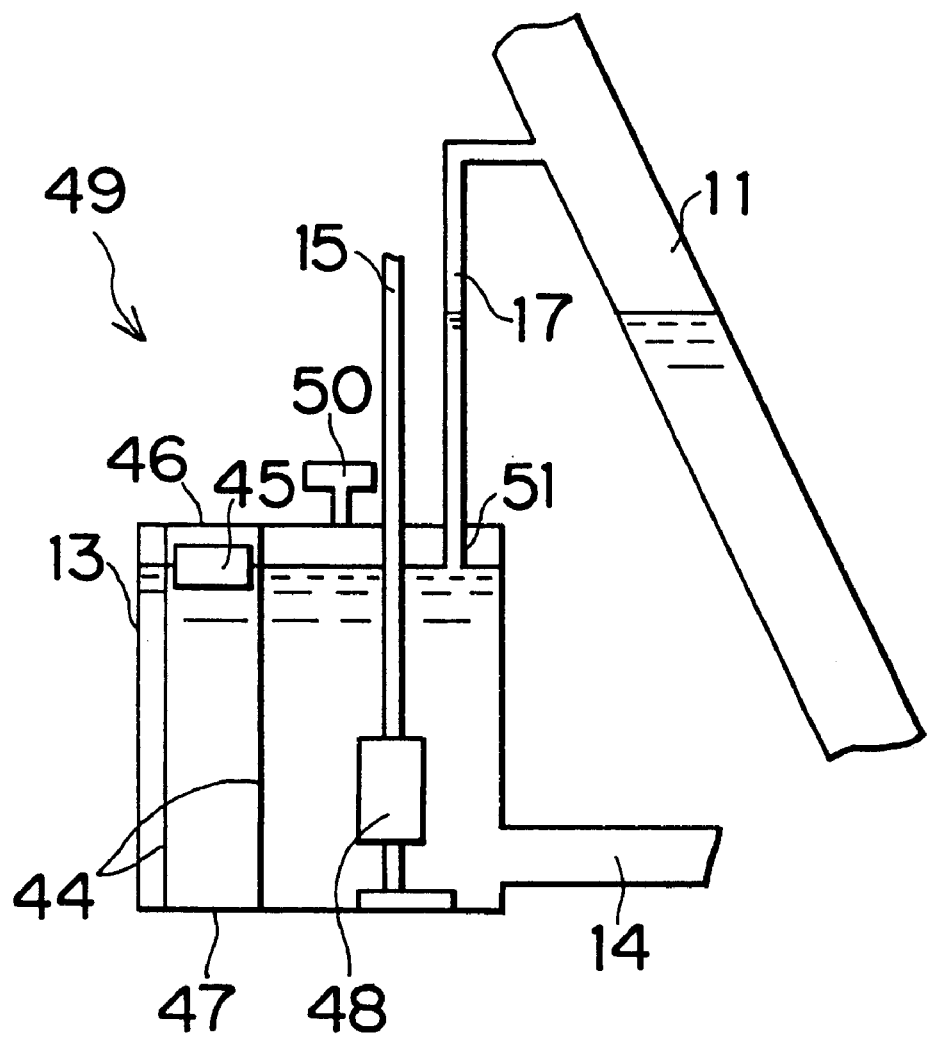
FIG. 15 is a cross-sectional view of the fuel pump device and a fuel supplying pipe of the sixth embodiment of the present invention.

As shown in FIGS. 14 and 15, a fuel indicator 49 of the sixth embodiment is provided with the guide wall 44 and the float 45, as is the case with the fifth embodiment. However, the fuel indicator 49 is further provided with a pressure sensor 50, and an opening end 51 of the gas discharging pipe 17 extends below the upper wall 46 of the fuel pump device 13. The pressure sensor 50 detects a pressure of the gas above the surface of liquid fuel in the fuel pump device 13. In the sixth embodiment, the opening end 51 of the gas discharging pipe 17 extends below the upper wall 46 of the fuel pump device 13. Therefore, even when the fuel pump device 13 contains a maximum amount of fuel to be accommodated therein, there is formed a space above the surface of liquid fuel in the fuel pump device 13.

In the sixth embodiment, when the upper wall 7 of the fuel tank 6 or the surface of liquid fuel is located higher than the opening end 51 of the gas discharging pipe 17, the surface of liquid fuel in the fuel pump device 13 coincides in position with the opening end 51 of the gas discharging pipe 17. The gas above the surface of liquid fuel in the fuel pump device 13 is compressed because of a difference in position (hereinafter, referred to as "liquid surface difference") between the surface of liquid fuel in the fuel pump device 13 and the upper wall 7 of the fuel tank 6 or the surface of liquid fuel therein. The greater the liquid surface difference becomes, the higher the pressure of the gas above the surface of liquid fuel in the fuel pump device 13 becomes. Therefore, the pressure sensor 50 detects a pressure of the gas above the surface of liquid fuel in the fuel pump device 13, whereby it becomes possible to detect an amount of fuel in the fuel tank 6. Conversely, when the upper wall 7 of the fuel tank 6 or the surface of liquid fuel is located lower than the opening end 51 of the gas discharging pipe 17, there is generated no liquid surface difference, so that the gas above the liquid surface in the fuel pump device 13 is not compressed. Accordingly, the pressure sensor 50 cannot detect an amount of fuel in the fuel tank 6. Then at this time, the amount of fuel in the fuel tank 6 is detected based on a position of the float 45 of the fuel indicator.

As a result, the sixth embodiment makes it possible to reduce the size of a fuel pump device that contains a fuel indicator and is disposed in a fuel storage device.

Next, a fuel indicator according to a seventh embodiment of the present invention will be explained. In the sixth embodiment, there is always a space above the surface of liquid fuel in the fuel pump device 13. Hence, fuel vapor is generated in the space above the surface of liquid fuel in the fuel pump device 13. Then the seventh embodiment makes it possible to minimize an amount of fuel vapor generated in a fuel pump device that contains a fuel indicator and is disposed in a fuel storage device.

Figure 16:
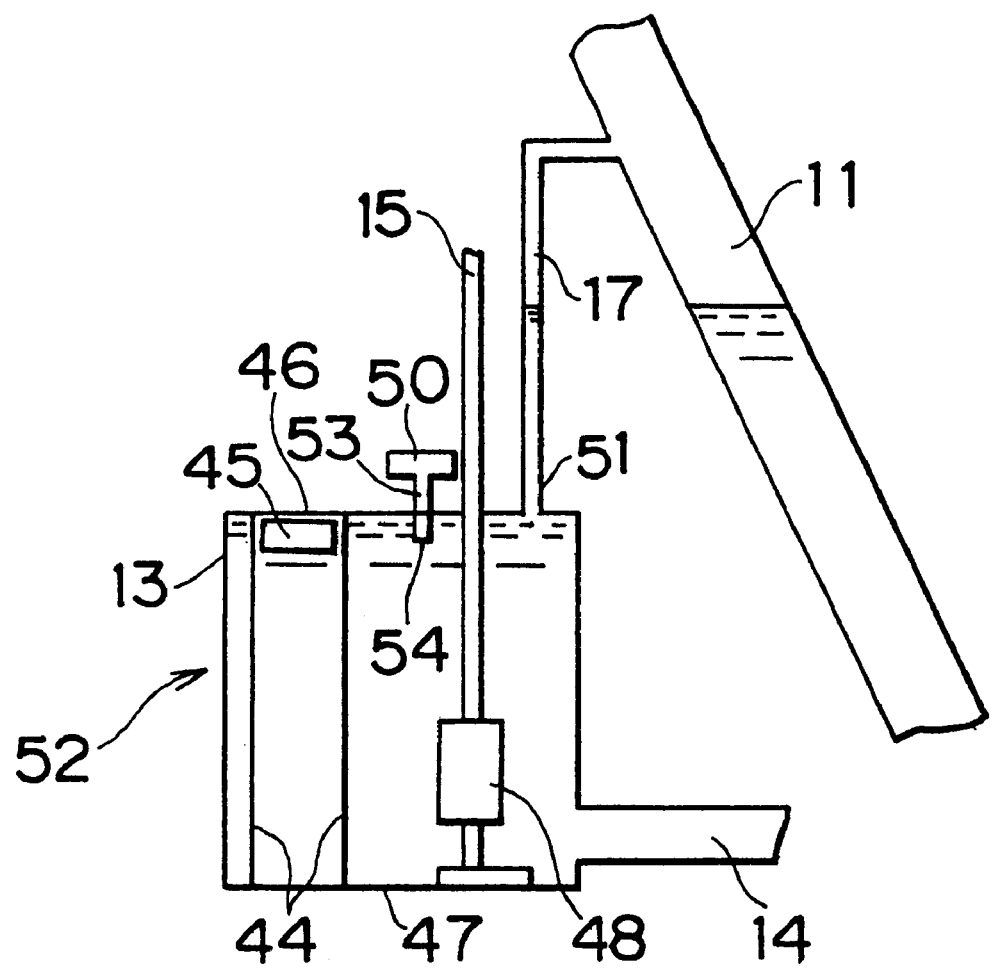
FIG. 16 is a cross-sectional view of a fuel pump device and a fuel supplying pipe of a seventh embodiment of the present invention.

As shown in FIG. 16, the fuel indicator 52 of the seventh embodiment is provided with the guide wall 44, the float 45 and the pressure sensor 50, as is the case with the sixth embodiment. However, in the fuel indicator 52 of the seventh embodiment, an opening end 54 of a pressure sampling pipe 53 of the pressure sensor 50 extends below the upper wall 46 of the fuel pump device 13. The opening end 51 of the gas discharging pipe 17 terminates at a position corresponding to the upper wall 46 of the fuel pump device 13. The pressure sensor 50 detects a pressure of gas in the pressure sampling pipe 53. In the seventh embodiment, the opening end 51 of the gas discharging pipe 17 terminates at a position corresponding to the upper wall 46 of the fuel pump device 13. Thus, when the fuel pump device 13 contains a maximum amount of fuel that can be accommodated therein, there is no space formed above the surface of liquid fuel in the fuel pump device 13. Therefore, until the upper wall 7 of the fuel tank 6 or the surface of liquid fuel therein becomes lower than the upper wall 46 of the fuel pump device 13, there is no space formed in the fuel pump device 13, except in the pressure sampling pipe 53. Hence, the amount of fuel vapor generated in the fuel pump device 13 can be maintained at a low level.

In the seventh embodiment, when the upper wall 7 of the fuel tank 6 or the surface of liquid fuel therein is located higher than the opening end 51 of the gas discharging pipe 17, the surface of liquid fuel in the fuel pump device 13 is located at a position corresponding to the opening end 51 of the gas discharging pipe 17. The gas in the pressure sampling pipe 53 is compressed because of a difference in position (hereinafter, referred to as "liquid surface difference") between the surface of liquid fuel in the fuel pump device 13 and the upper wall 7 of the fuel tank 6 or the surface of liquid fuel therein. The greater the liquid surface difference becomes, the higher the pressure in the pressure sampling pipe 53 becomes. Therefore, the pressure sensor 50 detects a pressure in the pressure sampling pipe 53, whereby it becomes possible to detect an amount of fuel in the fuel tank 6. Conversely, when the upper wall 7 of the fuel tank 6 or the surface of liquid fuel is located lower than the opening end 51 of the gas discharging pipe 17, there is generated no liquid surface difference, so that the gas in the pressure sampling pipe 53 is not compressed. Accordingly, the pressure sensor 50 cannot detect an amount of fuel in the fuel tank 6. Then at this time, the amount of fuel in the fuel tank 6 is detected based on a position of the float 45 of the fuel indicator 52.

Next, a fuel indicator according to an eighth embodiment of the present invention. will be explained. In the seventh embodiment, a pressure sensor is required to detect an amount of fuel in the fuel tank. Consequently, the manufacturing costs for the fuel storage device increase. It is also necessary to create a space in which the float is to be disposed. For this reason, the fuel pump device is oversized. Then the eighth embodiment provides a fuel indicator that does not necessitate a pressure sensor and prevents the fuel pump device from being enlarged.

Figure 17:
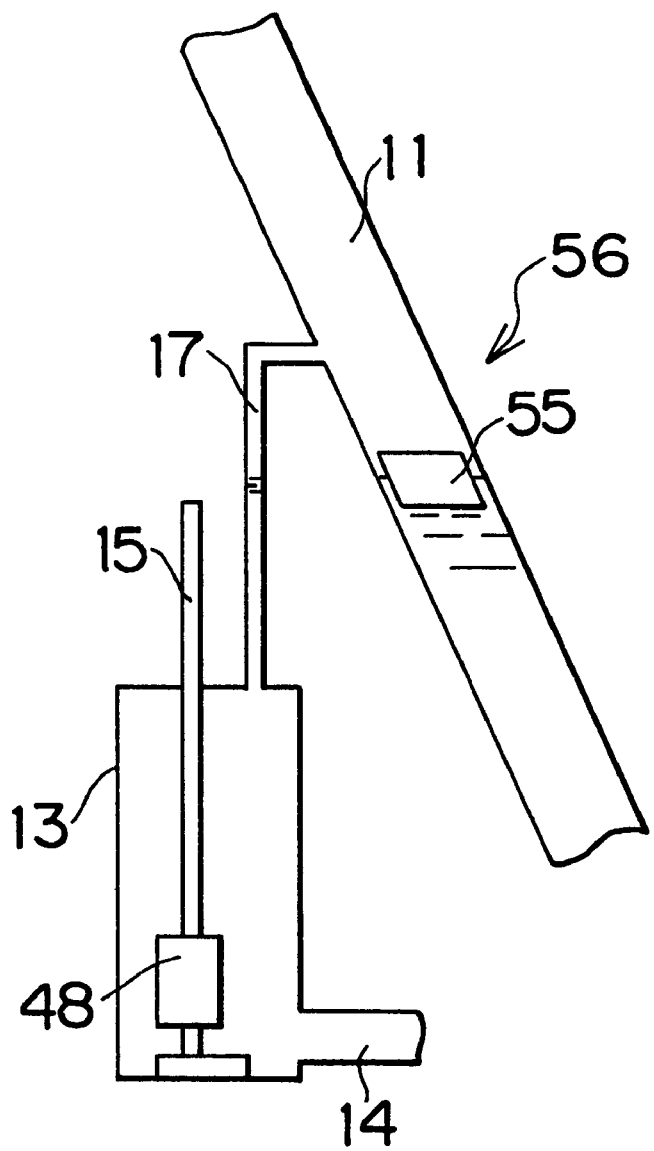
FIG. 17 is a cross-sectional view of a fuel pump device and a fuel supplying pipe of an eighth embodiment of the present invention.

As shown in FIG. 17, the fuel indicator 56 of the eighth embodiment is provided with a float 55 that is disposed in the fuel supplying pipe 11. That is, the fuel indicator 56 is not provided with the pressure sensor, the guide wall and the float of the seventh embodiment. For this reason, the fuel pump device is smaller in size than the fuel pump device of the seventh embodiment. The construction of the eighth embodiment is the same as that of the seventh embodiment in other respects, and therefore will not be explained.

In the eighth embodiment, the upper end 42 of the fuel supplying pipe 11 is located higher than the upper wall 7 of the fuel tank 6 or the surface of liquid fuel therein when the fuel tank 6 contains a maximum possible amount of fuel. The lower end 41 of the fuel supplying pipe 11 is located lower than the lower wall 8 of the fuel tank 6 when the fuel tank 6 assumes its minimum inner volume. Therefore, the float 55 of the fuel indicator 56 makes it possible to detect an amount of fuel in the fuel tank 6 which ranges from its minimum level to its maximum level. As described above, the position of the float is detected based on contact of a contact point provided on the fuel supplying pipe 11 with a contact point in the float. Furthermore, it is also possible to detect a position of the liquid surface in the fuel supplying pipe by means of a plurality of liquid surface sensors, which are aligned and attached to the fuel supplying pipe 11 so as to extend from the upper end to the lower end thereof While the present invention has been described with reference to what are presently considered to be preferred embodiments thereof, it is to be understood that the present invention is not limited to the disclosed embodiments or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A fuel amount detector, comprising:
   a fuel storage device including a main fuel chamber an inner volume of which changes in accordance with an amount of fuel stored therein and an auxiliary fuel chamber and inner volume of which does not change in accordance with an amount of fuel stored therein, the auxiliary fuel chamber being connected to a lower area of the main fuel chamber and located outside the main fuel chamber, wherein the amount of fuel in the main fuel chamber is detected based on a change in a level of a surface of liquid fuel in the auxiliary chamber, and
   a float for detecting a level of a surface of liquid fuel in the auxiliary chamber, wherein the fuel amount detector detects the amount of fuel in the main fuel chamber based on the level of the surface of liquid fuel in the auxiliary fuel chamber.

2. The fuel amount detector according to claim 1, wherein a bottom of the auxiliary fuel chamber is lower than a bottom of the main fuel chamber.

3. The fuel amount detector according to claim 1, wherein the auxiliary fuel chamber is connected to the main fuel chamber at the lowest portion of the main fuel chamber when there is no fuel in the main fuel chamber.

4. A fuel amount detector, comprising:
   a fuel storage device including a main fuel chamber an inner volume of which changes in accordance with an amount of fuel stored therein and an auxiliary fuel chamber and inner volume of which does not change in accordance with an amount of fuel stored therein, the auxiliary fuel chamber being connected to a lower area of the main fuel chamber and located outside the main fuel chamber, wherein the amount of fuel in the main fuel chamber is detected based on a pressure in the auxiliary fuel chamber that changes in accordance with a level of a surface of liquid fuel in the auxiliary chamber, and
   a pressure sensor for detecting a pressure in the main fuel chamber,
   wherein
      the auxiliary chamber is provided with a gas storage portion that communicates with the auxiliary fuel chamber,
      the pressure sensor detects a pressure of gas in the gas storage portion, and
      the fuel amount detector detects the amount of fuel in the main fuel chamber based on the pressure of gas in the gas storage portion.

5. The fuel amount detector according to claim 4, wherein the auxiliary fuel chamber includes a gas discharging pipe through which gas is discharged from the auxiliary fuel chamber, and wherein the gas discharging pipe opens to the auxiliary fuel chamber at a location lower than an upper wall of the auxiliary fuel chamber.

6. The fuel amount detector according to claim 4, wherein the auxiliary fuel chamber includes a gas discharging pipe through which gas is discharged from the auxiliary fuel chamber, and wherein the gas discharging pipe opens into the auxiliary fuel chamber at a location in an upper wall of the auxiliary fuel chamber,
   the pressure sensor is provided with a pressure sampling pipe extending below the upper wall of the auxiliary fuel chamber and detecting a pressure of gas stored in the pressure sampling pipe, and
   the fuel amount detector detects the amount of fuel in the main fuel chamber based on a pressure of gas detected by the pressure sensor.

* * * * *